United States Patent [19]

Fager et al.

[11] Patent Number: 5,527,551
[45] Date of Patent: Jun. 18, 1996

[54] METHOD AND APPARATUS FOR FORMING A CONTINUOUS SHEET OF CHEESE

[75] Inventors: Orville C. Fager; Matthew T. Stenzel, both of Green Bay, Wis.

[73] Assignee: Schreiber Foods, Inc., Green Bay, Wis.

[21] Appl. No.: 534,742

[22] Filed: Sep. 27, 1995

Related U.S. Application Data

[63] Continuation of Ser. No. 398,393, Mar. 3, 1995, abandoned, which is a continuation of Ser. No. 291,787, Aug. 17, 1994, abandoned, which is a continuation of Ser. No. 106,301, Aug. 12, 1993, abandoned.

[51] Int. Cl.$^6$ .............. A01J 25/00; A23P 1/00; B29D 7/00
[52] U.S. Cl. .......... 426/515; 264/212; 425/363; 425/371; 425/404; 426/517
[58] Field of Search .............. 426/512, 515, 426/517; 425/363, 367, 371, 373, 404; 264/212

[56] References Cited

U.S. PATENT DOCUMENTS

| | | | |
|---|---|---|---|
| 2,611,150 | 9/1952 | Goulding, Jr. | 425/367 |
| 2,799,586 | 7/1957 | Hensgen et al. | 426/515 |
| 3,487,143 | 12/1969 | Bergvall | 425/404 |
| 3,554,765 | 1/1971 | Pontegorvo et al. | 426/517 |
| 3,748,073 | 7/1973 | Lankford et al. | 425/92 |
| 4,111,626 | 9/1978 | Funakoshi et al. | 425/203 |
| 4,178,147 | 12/1979 | Hayashi | 425/372 |
| 4,276,317 | 6/1981 | Hayashi | 426/501 |
| 4,311,657 | 1/1982 | Koster | 425/371 |
| 4,362,754 | 12/1982 | Wenger et al. | 426/503 |
| 4,421,776 | 12/1983 | Brinkers et al. | 426/502 |
| 4,596,523 | 6/1986 | Whitehead | 425/367 |
| 4,631,017 | 12/1986 | Hayashi | 425/335 |
| 4,735,817 | 4/1988 | Smith | 426/517 |
| 4,770,619 | 9/1988 | Rijkaart | 425/96 |
| 5,079,014 | 1/1992 | Morikawa et al. | 426/231 |
| 5,091,202 | 2/1992 | Hayashi | 426/496 |
| 5,110,277 | 5/1992 | Hayashi | 425/141 |
| 5,124,163 | 6/1992 | Hayashi | 426/231 |

*Primary Examiner*—George Yeung
*Attorney, Agent, or Firm*—Willian Brinks Hofer Gilson & Lione

[57] ABSTRACT

A method and apparatus for forming a continuous sheet of molten, moldable or plasticized material, especially a food product such as cheese. The invention may also be used to form a continuous sheet of other food products, such as noodles, peanut butter, jellies and the like. The apparatus comprises at least two sets of opposed rollers and a pair of endless belts. At least one of the first set of rollers, defined as forming rollers for purposes of distinction, has a concave surface. Each of another set of rollers, defined as discharge rollers for purposes of distinction, is disposed downstream from the first set of rollers and has a substantially flat surface. Each endless belt circulates about a group of rollers comprised of a forming roller and a discharge roller. In the region between opposed roller sets, the endless belts cooperate with each other and with the rollers to form a pocket that receives and maintains the cheese. The distance between the outer surfaces of the belts corresponds to the desired thickness of the sheet of cheese. A motor causes the forming and discharge rollers to spin about their longitudinal axes and the first and second endless belts to revolve about the rollers.

50 Claims, 4 Drawing Sheets

METHOD AND APPARATUS FOR FORMING A CONTINUOUS SHEET OF CHEESE

This application is a continuation of application Ser. No. 08/398,393, filed Mar. 3, 1995, now abandoned, which is a continuation of application Ser. No. 08/291,787, filed Aug. 17, 1994, now abandoned, which is a continuation of application Ser. No. 08/106,301, filed Aug. 12, 1993, now abandoned.

BACKGROUND OF THE INVENTION

The present invention relates to forming a continuous sheet of molten, moldable, or plasticized material, especially a food product such as cheese. More specifically it is directed to forming a sheet of cheese having precisely controllable dimensions of width and thickness. As used herein, the term "cheese" is intended to embrace natural cheese, processed cheese, cheese food products, imitation cheese, and the like.

Machines for forming a continuous sheet of moldable plasticized material are well known in the art, and have been used to form a continuous sheet of cheese. One such arrangement is shown in U.S. Pat. No. 4,735,817. A hot cheese mass is extruded onto a belt upstream of a spreader roller. A reservoir of cheese accumulates immediately upstream of the spreader roller, and the combined movements of the belt and the spreader roller draw the cheese between the belt and spreader roller, spreading the cheese in a thin layer. This sheet of cheese is then carried further downstream by the belt for additional processing.

Another arrangement for forming a continuous sheet of cheese utilizes a manifold in conjunction with a conventional casting line, such as the Natec Chill Roll or the Hart Casting Line, both of which are commercially available. Such casting lines comprise one or more endless belts, a series of rollers, and often a cooling agent which accelerates the cooling of the material as it advances upon the endless belt or belts. Molten cheese is extruded through the orifices of the manifold directly onto the advancing belt of the casting line. The orifices of the manifold are arranged and the consistency of the cheese is controlled such that the molten cheese spreads upon the advancing belt to form a continuous sheet of cheese. This sheet of cheese is cooled upon and carried further downstream by the belt for additional processing.

The disadvantage of forming a continuous sheet of cheese by these and other present methods rests in the necessarily limited ability to control the thickness and width of the sheet of cheese. Neither of the above described methods provides precise control over the dimensions of the cheese. The width of the sheet of cheese is not always uniform, resulting in a sheet of cheese whose width may be greater or less than the width of the advancing belt.

Precise control over the dimensions of the sheet of cheese will eliminate waste, appearing in the form of either trim on the edges of the advancing belt which must be cut off or areas of the belt which are not being efficiently utilized. Likewise, precise control over the thickness of cheese is necessarily limited, especially where a manifold is used to deposit a layer of cheese upon an advancing belt. Precise control over the dimensions of the cheese will also enhance further processing of the cheese, such as slicing or shredding of the cheese downstream of the casting line.

Therefore, it is a primary object of the present invention to provide an arrangement for processing cheese and other food products with more precise control over the dimensions of the product than presently available means.

It is also an object of the invention to provide an arrangement for processing cheese and other food products at lower temperatures than presently available means.

SUMMARY OF THE INVENTION

The present invention provides an apparatus for forming a continuous sheet of molten, moldable or plasticized materials especially food products such as cheese. The invention may also be used to form a continuous sheet of other food products, such as noodles, peanut butter, jellies and the like.

The forming apparatus of the invention comprises at least two sets of opposed rollers and a pair of endless belts. At least one of the first set of rollers define forming rollers and have a concave surface. Each of another set of rollers define discharge rollers and is disposed downstream from the first set of rollers and has a substantially flat surface.

Each endless belt circulates about a group of rollers comprised of a forming roller and a discharge roller. In the region between opposed roller sets, the endless belts cooperate with each other and with the rollers to form a pocket that receives and maintains the cheese. The distance between the outer surfaces of the belts corresponds to the desired thickness of the sheet of cheese. A motor causes the forming and discharge rollers to spin about their longitudinal axes and the first and second endless belts to revolve about the rollers.

A fill tube emits the material, such as cheese, upon the endless belts immediately upstream of the forming rollers. The material may be in molten or substantially liquid form at this point, or it may be cooled so that it is in a "doughy" or moldable state. As used herein, the term "liquid" shall be understood to include any molten, moldable or fluid material.

The sheet of material, especially a food product such as cheese, formed by the invention then may be cooled upon a conventional casting line. Multiple sheet formers may be used in conjunction with a single casting line.

The invention permits precise control over the dimensions of the sheet which is formed. This control eliminates the waste inherent in present methods and apparatus, such waste appearing in the form of either trim on the edges of the advancing belt which must be cut off or areas of the belt which are not being efficiently utilized. The thickness of the produced sheet is likewise maintained precisely. Precise control over the dimensions of the cheese also enhances further processing of the cheese, such as slicing or shredding of the cheese downstream of the casting line.

A further advantage of the invention rests in its ability to process cheese at lower temperatures. Lower processing temperatures equates to greater control over the consistency of the product and to decreased downstream cooling requirements. Decreased cooling requirements equates to a shorter and less complicated cooling or casting phase and thus to more a compact and space efficient casting line. When used in conjunction with complicated downstream processing equipment such as a casting line, a slicer or a shredder, the overall system is readily seen to be more efficient and of lower profile.

These and other advantages of the present invention, as well as the preferred embodiment thereof, will best be understood in view of the appended drawings, a brief description of which follows.

DETAILED DESCRIPTION OF THE DRAWINGS AND PREFERRED EMBODIMENTS OF THE INVENTION

Figure 1:
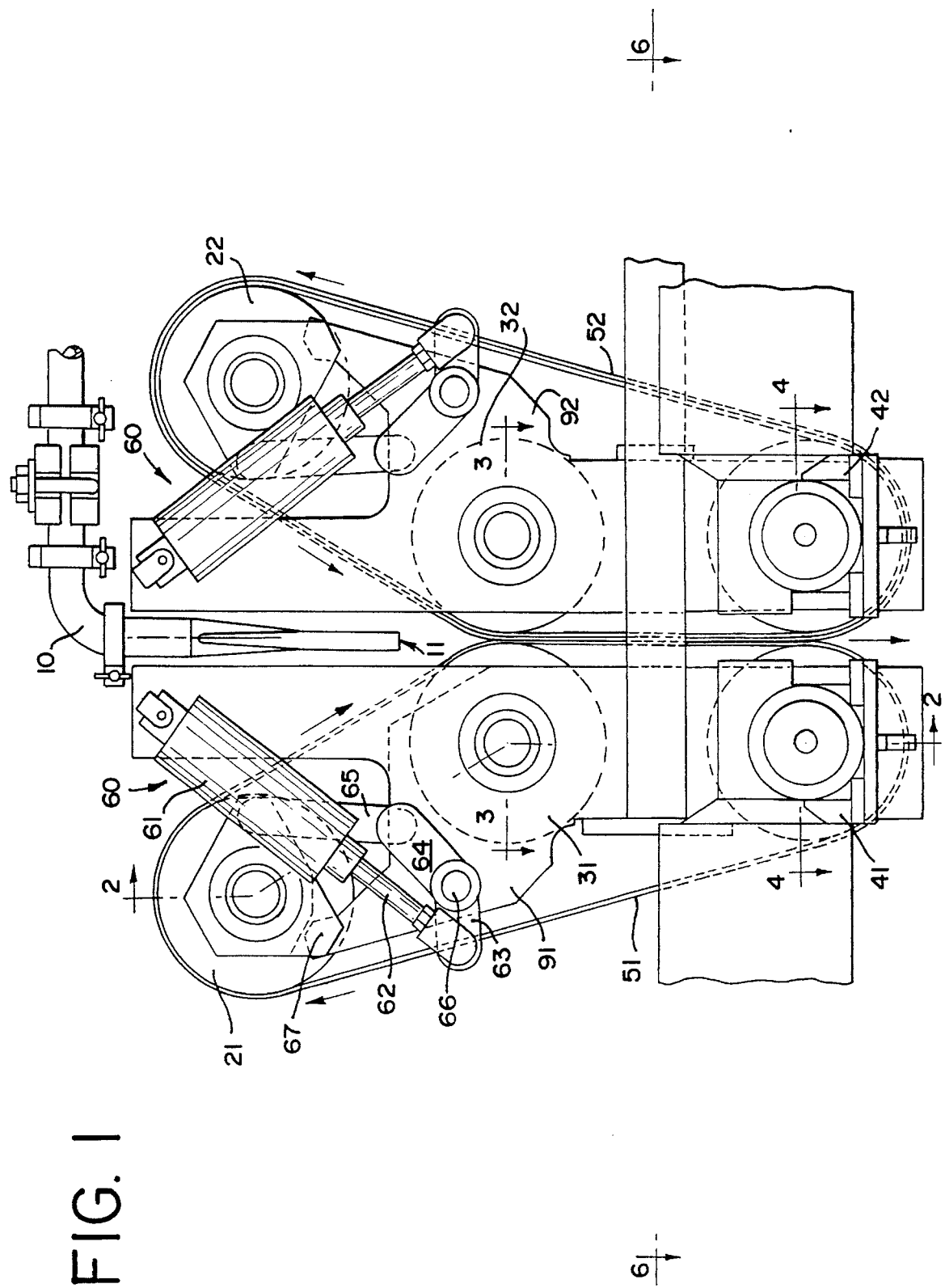
FIG. 1 is a side view of a preferred embodiment of the sheet former of the present invention.
Figure 3:
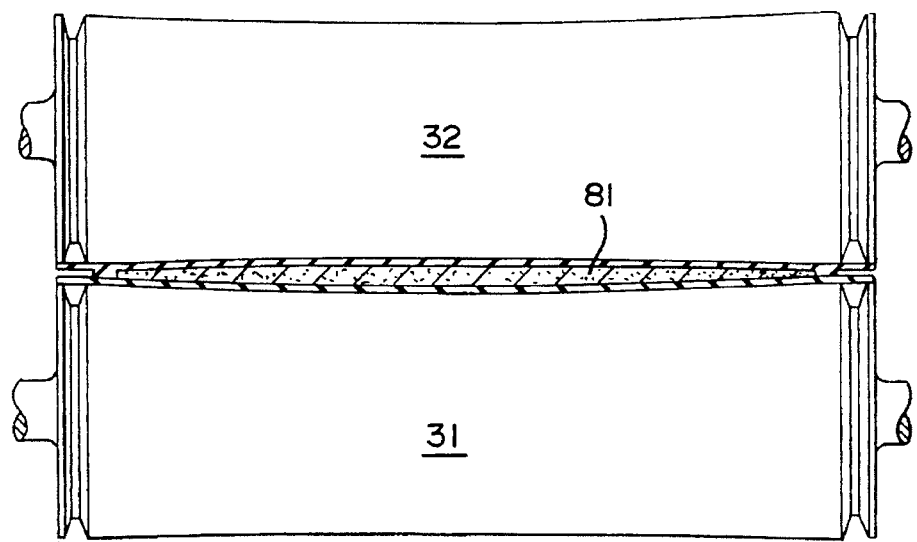
FIG. 3 is a cross sectional top view taken along line 3—3 of FIG. 1.

FIG. 1 shows a side view of a preferred embodiment of the sheet former. The sheet former comprises a first pair of rollers 31 and 32, defining forming rollers. As shown in FIG. 3, at least one and preferably each of forming rollers 31 and 32 has a substantially concave surface. In a presently used embodiment, the forming rollers are manufactured of 316 stainless steel, are of length 26.56 inches, diameter 6.5 inches and have a radius of curvature of 161.75 inches. These forming rollers 31 and 32 are positioned in opposed fashion such that their longitudinal axes are parallel to one another and are in a substantially horizontal plane shown as line 3—3 in FIG. 1.

Figure 4:
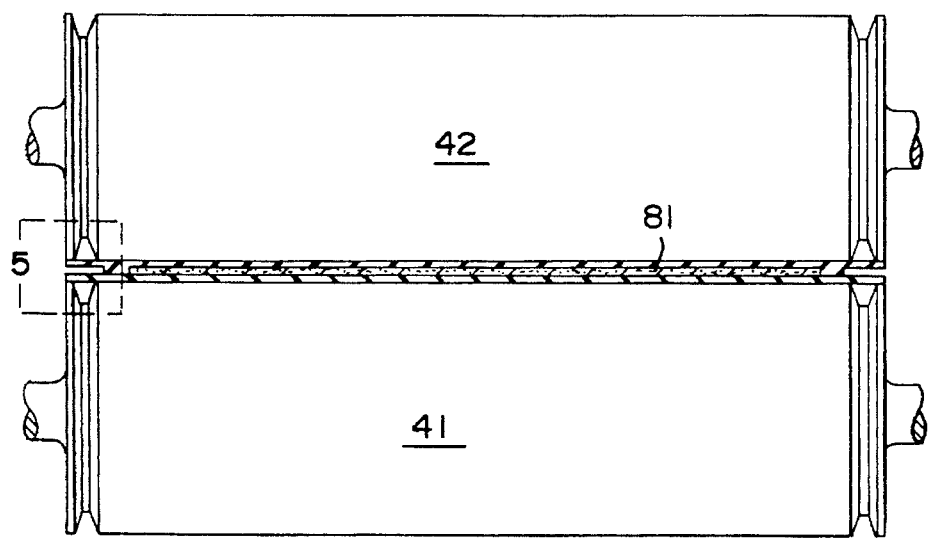
FIG. 4 is a cross sectional top view taken along line 4—4 of FIG. 1.

A second pair of rollers 41 and 42, defining discharge rollers, is disposed downstream from the first pair of rollers 31 and 32. As shown in FIG. 4, each of rollers 41 and 42 has a substantially flat surface. These discharge rollers 41 and 42 are positioned in opposed fashion such that their longitudinal axes are parallel to one another and are in a substantially horizontal plane shown as line 4—4 in FIG. 1. In the preferred embodiment shown in FIG. 1, the second pair of rollers 41 and 42 is positioned directly below the first pair of rollers 31 and 32.

A third pair of rollers 21 and 22 is disposed upstream of the first pair of rollers 31 and 32. The longitudinal axis of each of rollers 21 and 22 is positioned off a line connecting the longitudinal axes of one of the first and second pair of rollers, for instance rollers 31 and 41.

Figure 5:
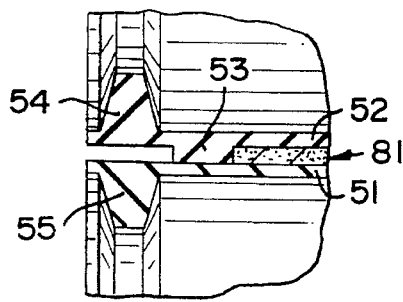
FIG. 5 is a enlarged view of region 5 of FIG. 4.

Two endless belts 51 and 52 each circulate about a group of rollers comprising one roller from each set of opposed roller pairs; that is, belt 51 circulates about rollers 21, 31 and 41 and belt 52 circulates about rollers 22, 32 and 42. Suitable belts used in a present embodiment were manufactured by Burrell-Leder Beltech, Inc. Each has a width of 21.120 inches, is made of E120/2 0+05 PVCB and is coated with polyurethane. Each may be coated with another non-stick coating, such as Teflon. As shown in FIG. 5, each belt includes near its outer edges and on its inner surface a raised section or guide 54 and 55 that cooperates with a channel or groove 71 provided on the surface of the rollers 21, 31 and 41 to maintain the endless belts 51 upon the surface of the rollers 21, 31 and 41 without slipping. The dimensions of the channels 71 correspond to a standard B V-section for a V-belt guide. The dimensions of the guides 54 and 55 are approximately that of the channels 71, and the guides are presently continuously molded to the belt.

As shown in FIGS. 3 and 4, and in greater detail in FIG. 5, the outer surface of one of the endless belts 52 includes raised strips or ribs 53 near the outer edges of the belt 52. The ribs 53 may be particularly dimensioned so as to obtain a particularly dimensioned product. The ribs presently being used are of height 1/16 inch and width 0.875 inches and are made of polyurethane. In the region between opposed roller pairs 31,32 and 41,42, the ribs 53 of one endless belt 52 cooperate with the outer surface of the other endless belt 51 to provide boundaries at the outer edges of the belts 51 and 52, so that a pocket 81 is formed between the endless belts 51 and 52. In so doing, the ribs 53 form a seal along the exterior edges of the belts 51 and 52, as exemplified in FIG. 5, such that cheese cannot escape the pocket 81. The compression of the opposed roller pairs 31,32 and 41,42 as well as the tension in the belts 51 and 52 themselves ensures a proper seal. The distance between the outer surfaces of the belts corresponds approximately to the desired thickness of the sheet of cheese. For example, where ribs of height 1/16 inch are used, a sheet of thickness 3/32 inch is produced. Likewise, the distance between the inside edges of the ribs 53 corresponds to the width of the sheet of cheese. Presently, the width between the edges of the ribs 53 is 18 inches. Alternatively, the outer surface of each of the endless belts may include at least one rib near an outer edge or outer edges of the belt.

Figure 2:
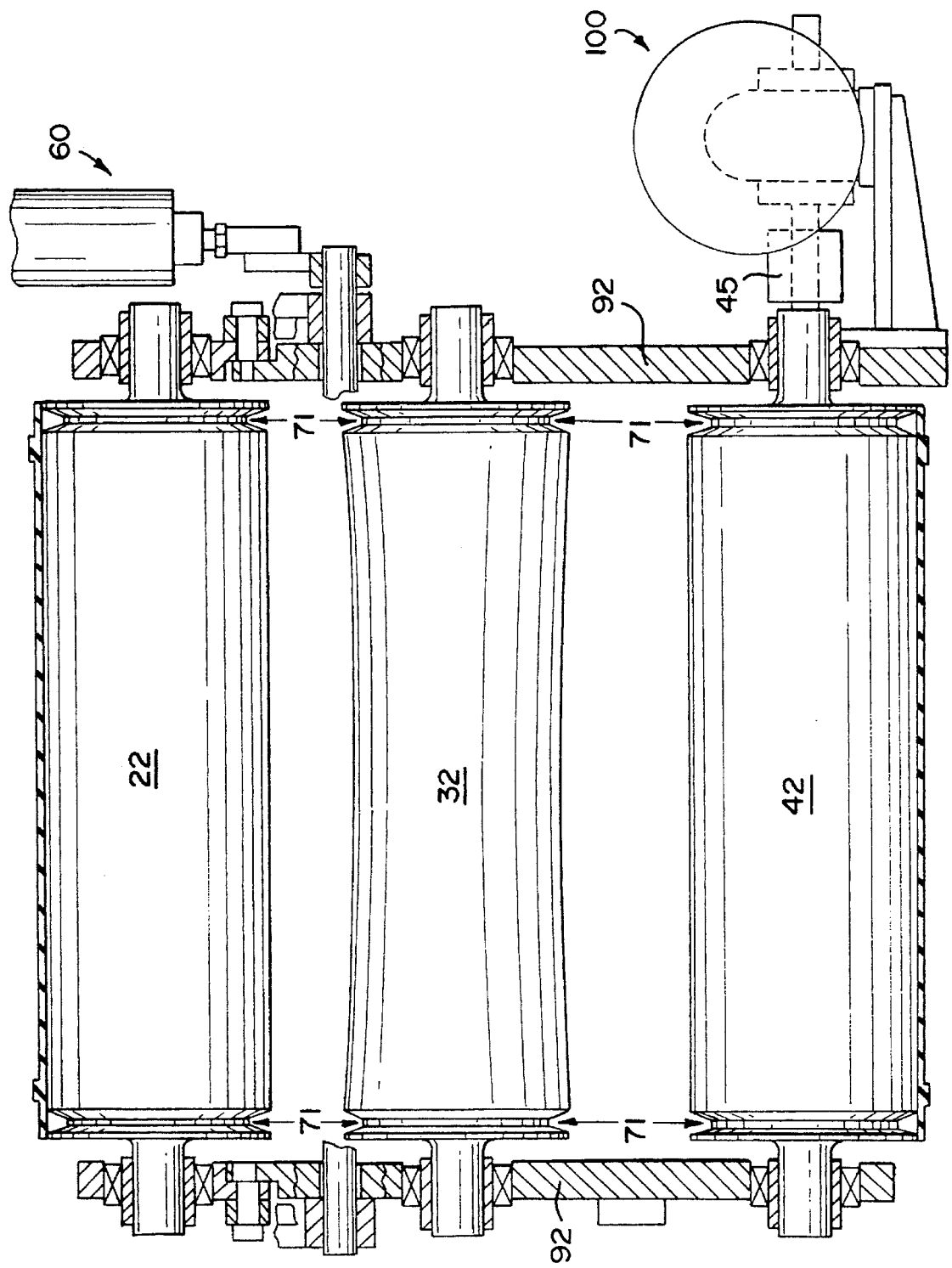
FIG. 2 is a cross sectional front view taken along line 2—2 of FIG. 1.

As shown in FIG. 2, the sheet former further comprises a motor 100 which is operatively connected to the central shaft 45 of roller 42. The motor 100 may be selected from among commercially available units, for example, a Leeson model no. C6T17NC2B or equivalent. The motor 100 causes roller 42 to rotate. A second motor (not shown) is identically operatively connected to roller 41 and causes roller 41 to rotate. Rotation of rollers 41 and 42 causes the endless belts 51 and 52 to revolve about roller groups 21, 31 and 41 and 22, 32 and 42, respectively. The direction of the advancing belts 51 and 52 is as shown in FIG. 1. As presently used, the belts circulate at 12 feet per minute with the motors operating synchronously. It is also contemplated that the motors may be operated asynchonously, and that a single motor may drive both rollers 41 and 42.

As shown in FIG. 1, the sheet former preferably further comprises a release mechanisms 60 for moving the rollers 21 and 22 out of operating position such that tension in the endless belts 51 and 52 is released, thus permitting the belts to be changed. The mechanism 60 comprises an actuator 61 and actuating member 62 which is connected to a series of members 63, 64 and 65. The actuating member 62 may be selected from commercially available units, for example, an air actuated cylinder manufactured by Price Engineering Co. Inc., BIMBA 503 DXP cylinder or equivalent. As actuating member 62 is withdrawn upwardly, members 63 and 64 rotate about pivot 66 causing member 65 to move downwardly. Downward movement of member 65 causes roller 21 to rotate about pivot 67 and move downwardly toward roller 31. Roller 22 is moveable in an identical fashion toward roller 32. This compression of the two sets of rollers 21,31 and 22,32 permits belt changes and belt adjustments.

Figure 6:
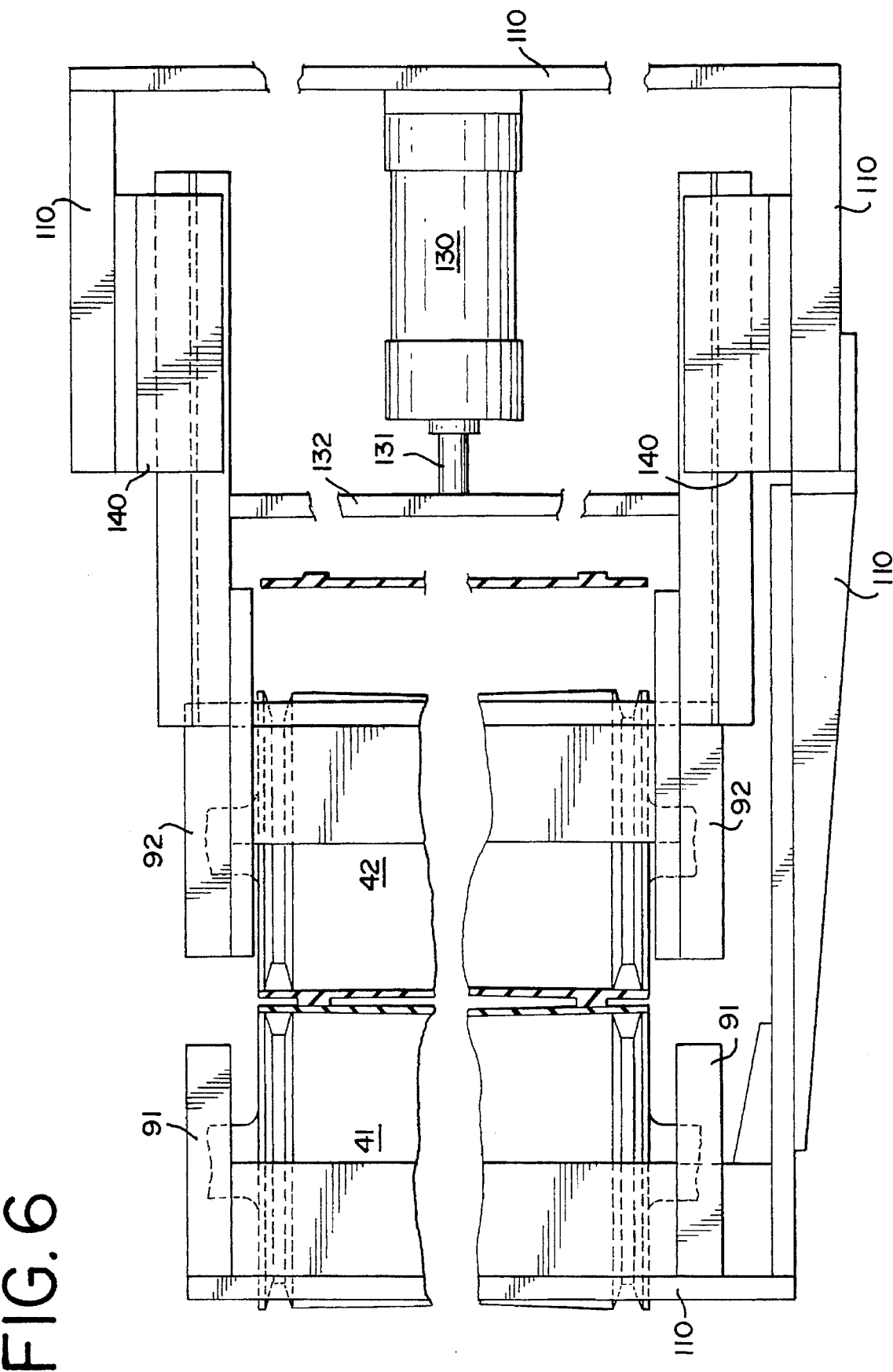
FIG. 6 is an expanded top cross-sectional view taken along line 6—6 of FIG. 1 showing some of the frame structure.

As shown in FIG. 6, frame member pairs 91 and 92, which support roller groups 21, 31 and 41 and 22, 32 and 42, respectively, may be moved horizontally away from each others permitting production of sheets of varying thickness and/or use of belts having differing rib geometries, as well as further facilitating the belt changing process. A network of frame pieces 110 provides added structural support to vertical frame member pairs 91 and 92 and permits the frame member pairs 91 and 92 to be moved horizontally toward or away from each other. Frame member 92 is connected to a track system 140, such as the Thomson Industries, Inc. slide system DSRC-12, and to frame member 132. An actuator 130 and actuating member 131 is connected to frame member 132. The actuator 130 may be chosen from commercially available units, for example an air actuated cylinder manufactured by National Utility Co. Inc. REXROTH TASKMASTER cylinder or equivalent. Actuation causes the frame member 92, and thus roller group 22, 32 and 42, to move horizontally toward or away from frame member 92, and thus roller group 21, 31 and 41.

As shown in FIG. 1, a fill tube 10 emits the material, especially a food product such as cheese, upon the endless belts 51 and 52 immediately upstream of the forming rollers 31 and 32. The cheese may be in molten or substantially liquid form at this point, or it may be cooled so that it is in a "doughy" or moldable state. Presently, cheddar cheese or cheddar type of cheese may be fed into the belt former at 130° F. The cheese accumulates in a mass or bubble above the opening or pocket 81 formed by the endless belts 51 and 52 and the opposed forming rollers 31 and 32. The positioning of rollers 21 and 22 is such that the endless belts 51 and 52 advance inwardly in their route to the pair of rollers 31 and 32, providing a receiving area or surface immediately upstream of the first roller pair 31 and 32 having greater cross-sectional area than that of the pocket 81 to accommodate the accumulated mass of cheese. The movement of the endless belts 51 and 52 causes the cheese to be drawn through the forming rollers 31 and 32, which rollers effectively meter the amount of cheese that passes downstream toward the second pair of rollers 41 and 42. Because the first pair of opposed rollers 31 and 32 includes at least one roller having a concave surface, the cross-sectional area of pocket 81 at this point is greater than the area downstream. The enlarged pocket area 81 upstream of discharge rollers 41 and 42 permits excess cheese to be buoyed up by the pressure of the compressed belts 51 and 52, so that only the precise amount of cheese advances downstream.

A sheet of material having uniform dimensions of width and thickness is expelled downstream of the second pair of rollers 41 and 42. The width and thickness of the cheese thus formed will have dimensions corresponding approximately to that of the pocket 81 in the region between the second pair of rollers 41 and 42, as shown in FIG. 4.

It must be appreciated that the apparatus of the present invention is capable of being incorporated in the form of a variety of embodiments, only some of which has been fully illustrated and described above. The invention may be embodied in other forms without departing from its spirit or essential characteristics. The described embodiments are to be considered in all respects only as illustrative and restrictive and the scope of the invention is, therefore, described by the appended claims rather than by the foregoing description. All changes which come within the meaning and range of equivalency of the claims are to be embraced within their scope.

We claim:

1. An apparatus for forming a sheet of material from a substantially liquid starting material comprising:
   at least two forming rollers positioned such that the longitudinal axis of each forming roller is substantially parallel to the longitudinal axis of another forming roller, at least one of said forming rollers having a substantially concave surface;
   at least two discharge rollers positioned downstream from the forming rollers and further positioned such that the longitudinal axis of each discharge roller is parallel to the longitudinal axis of another discharge roller, each discharge roller having a substantially flat surface;
   a first endless belt that revolves about a forming roller and a discharge roller;
   a second endless belt that revolves about a forming roller and a discharge roller, the first and second endless belts cooperating with each other and with the rollers when the belts are between opposed forming and discharge rollers to form a pocket; and
   a drive mechanism that causes the forming and discharge rollers to spin about their longitudinal axis and the first and second endless belts to revolve about the rollers.

2. The apparatus of claim 1 wherein each of the forming rollers has a substantially concave surface.

3. The apparatus of claim 1 wherein the first endless belt has at least one rib disposed on an outer surface and positioned near at least one of the exterior edges of the belt, the rib contacting the second endless belt when the belts are between opposed forming and discharge roller pairs so as to form a seal.

4. The apparatus of claim 3 wherein the second endless belt has at least one rib disposed on an outer surface and positioned near at least one of the exterior edges of the belt, the ribs of the first and second endless belts contacting the other endless belt when the belts are between opposed roller pairs so as to form a seal.

5. The apparatus of claim 1 wherein the forming and discharge rollers each further comprise at least one channel in the surface of the roller.

6. The apparatus of claim 5 wherein the first and second endless belts each further comprise at least one guide on an inner surface of each belt, the guides being disposed to cooperate with the channels of the forming and discharge rollers to maintain the belts in an operable position.

7. The apparatus of claim 1 wherein the discharge rollers are positioned substantially horizontally below the forming rollers.

8. The apparatus of claim 1 further comprising a pair of rollers positioned upstream of the forming rollers and each disposed such that its longitudinal axis is off a line connecting the longitudinal axis of one roller of each of the forming and discharge rollers.

9. The apparatus of claim 1 further comprising a fill tube positioned upstream of the forming rollers.

10. An apparatus for forming a sheet of material from a substantially liquid starting material comprising:
    at least two forming rollers positioned such that the longitudinal axis of each forming roller is substantially parallel to the longitudinal axis of another forming roller, at least one of the forming rollers having a substantially concave surface;
    at least two discharge rollers positioned downstream from the forming rollers and further positioned such that the longitudinal axis of each discharge roller is parallel to the longitudinal axis of another discharge roller, each discharge roller having a substantially flat surface;
    a first endless belt revolving about a forming roller and a discharge roller, the first endless belt having at least one rib disposed on an outer surface and positioned near at least one of the exterior edges of the belt;
    a second endless belt revolving about a forming roller and a discharge roller, the second endless belt having at least one rib disposed on an outer surface and positioned near at least one of the exterior edges of the belt, the ribs of the first and second endless belts contacting the other endless belt when the belts are between opposed forming and discharge rollers so as to form a seal; and a drive mechanism that causes the forming and discharge rollers to spin about their longitudinal axes and the first and second endless belts to revolve about the rollers.

11. The apparatus of claim 10 wherein each of the forming rollers has a substantially concave surface.

12. The apparatus of claim 10 wherein each endless belt has ribs disposed on its outer surface and positioned along each of its exterior edges.

13. The apparatus of claim 10 wherein the ribs are compressible.

14. The apparatus of claim 10 wherein the forming and discharge rollers each further comprise at least one channel in the surface of the roller.

15. The apparatus of claim 14 wherein the first and second endless belts each further comprise at least one guide disposed on an inner surface of each belt, the guides being positioned to cooperate with the channels of the forming and discharge rollers to maintain the belts in an operable position.

16. The apparatus of claim 10 wherein the discharge rollers are positioned substantially horizontally below the forming rollers.

17. The apparatus of claim 10 further comprising at least two rollers positioned upstream of the forming rollers and each disposed such that its longitudinal axis is off a line connecting the longitudinal axis of one roller of each of the forming and discharge rollers.

18. The apparatus of claim 10 further comprising a fill tube positioned upstream of the forming rollers.

19. An apparatus for forming a sheet of material from a substantially liquid starting material comprising:

at least two forming rollers positioned such that the longitudinal axis of each forming roller is substantially parallel to the longitudinal axis of another forming roller, at least one of the forming rollers having a substantially concave surface;

at least two discharge rollers positioned downstream from the forming rollers and further positioned such that the longitudinal axis of each discharge roller is parallel to the longitudinal axis of another discharge roller, each discharge roller having a substantially flat surface;

a first endless belt that revolves about a forming roller and a discharge roller;

a second endless belt that revolves about a forming roller and a discharge roller, the second endless belt having ribs disposed on an outer surface and positioned near exterior edges of the belt, the ribs contacting the first endless belt when the belts are between opposed forming and discharge rollers so as to form a seal; and a drive mechanism that causes the forming and discharge rollers to spin about their longitudinal axes and the first and second endless belts to revolve about the rollers.

20. The apparatus of claim 19 wherein each of the forming rollers has a substantially concave surface.

21. The apparatus of claim 19 wherein the first endless belt has ribs disposed on its outer surface and positioned near each of its exterior edges.

22. The apparatus of claim 19 wherein the ribs are compressible.

23. The apparatus of claim 19 wherein the forming and discharge rollers each further comprise at least one channel in the surface of the roller.

24. The apparatus of claim 23 wherein the first and second endless belts each further comprise at least one guide disposed on an inner surface of each belt, the guides being positioned to cooperate with the channels of the forming and discharge rollers to maintain the belts in an operable position.

25. The apparatus of claim 19 wherein the discharge rollers are positioned substantially horizontally below the forming rollers.

26. The apparatus of claim 19 further comprising at least two rollers positioned upstream of the forming rollers and each disposed such that its longitudinal axis is off a line connecting the longitudinal axis of one roller of each of the forming and discharge rollers.

27. The apparatus of claim 19 further comprising a fill tube positioned upstream of the forming rollers.

28. An apparatus for forming a sheet of material from a substantially liquid starting material comprising:

a pair of forming rollers positioned such that the longitudinal axis of each concave roller is substantially parallel to the longitudinal axis of the other forming roller, each forming roller having a substantially concave surface;

a pair of discharge rollers positioned downstream from the pair of forming rollers and further positioned such that the longitudinal axis of each discharge roller is parallel to the longitudinal axis of the other discharge roller, each discharge roller having a substantially flat surface;

a first endless belt that revolves about a forming roller and a discharge roller, the first endless belt having at least one rib disposed on an outer surface and positioned near at least one of the exterior edges of the belt;

a second endless belt that revolves about a forming roller and a discharge roller, the second endless belt having at least one rib disposed on an outer surface and positioned near at least one of the exterior edges of the belt, the ribs of the first and second endless belts contacting the other endless belt when the belts are between opposed forming and discharge roller pairs so as to form a seal; and a drive mechanism that causes the forming and discharge rollers to spin about their longitudinal axes and the first and second endless belts to revolve about the rollers.

29. The apparatus of claim 28 wherein each endless belt has two ribs disposed on its outer surface and positioned near each of its exterior edges.

30. The apparatus of claim 28 wherein the ribs are compressible.

31. The apparatus of claim 28 wherein the forming and discharge rollers each further comprise at least one channel in the surface of the roller.

32. The apparatus of claim 31 wherein the first and second endless belts each further comprise at least one guide disposed on an inner surface of each belt, the guides being positioned to cooperate with the channels of the forming and discharge rollers to maintain the belts in an operable position.

33. The apparatus of claim 28 wherein the pair of discharge rollers is positioned substantially horizontally below the pair of forming rollers.

34. The apparatus of claim 28 further comprising a pair of rollers positioned upstream of the pair of forming rollers and each disposed such that its longitudinal axis is off a line connecting the longitudinal axis of one roller of each of the forming and discharge roller pairs.

35. The apparatus of claim 28 further comprising a fill tube positioned upstream of the forming rollers.

36. A method for forming a sheet of material from a substantially liquid starting material comprising the steps of:

providing at least two sets of opposed rollers and first and second endless belts, at least one of a first set of opposed rollers having a substantially concave surface, each of the first and second endless belts being positioned about at least one roller of each set of opposed rollers;

emitting material in substantially liquid form upon the endless belts upstream of the first set of opposed rollers; and causing the rollers to spin and the first and second endless belts to revolve about the rollers such that a sheet of material is produced upon drawing the material between the two sets of opposed rollers.

37. An apparatus for forming a sheet of material from a substantially liquid starting material comprising:

at least one forming roller having a substantially concave surface;

a member which opposes the forming roller;

at least one discharge roller positioned downstream from the at least one forming roller, the at least one discharge roller having a substantially flat surface;

a member which opposes the discharge roller;

a first endless belt that revolves about a forming roller and a discharge roller;

a second endless belt that advances in the same direction as the first endless belt advances, the first and second endless belts cooperating with each other and with the rollers when the belts are between forming and discharge rollers and the opposing members to form a pocket; and a drive mechanism that causes the forming and discharge rollers to spin about their longitudinal axis and the first and second endless belts to revolve about the rollers.

38. The apparatus of claim 37 wherein the member that opposes the forming roller comprises a second roller positioned such that the longitudinal axis of the second roller is substantially parallel to that of the forming roller.

39. The apparatus of claim 38 wherein the second roller has a substantially concave surface.

40. The apparatus of claim 37 wherein the member that opposes the discharge roller is a second roller positioned such that the longitudinal axis of the second roller is substantially parallel to that of the discharge roller.

41. The apparatus of claim 40 wherein the second roller has a substantially flat surface.

42. The apparatus of claim 37 wherein the first endless belt has at least one rib disposed on an outer surface and positioned near at least one of the exterior edges of the belt, the rib contacting the second endless belt when the belts are between opposed forming and discharge roller pairs so as to form a seal.

43. The apparatus of claim 37 wherein the second endless belt has at least one rib disposed on an outer surface and positioned near at least one of the exterior edges of the belt, the ribs of the first and second endless belts contacting the other endless belt when the belts are between opposed roller pairs so as to form a seal.

44. The apparatus of claim 37 wherein the discharge roller is positioned substantially horizontally below the forming roller.

45. The apparatus of claim 37 further comprising at least one roller positioned upstream of the at least one forming roller and disposed such that its longitudinal axis is off a line connecting the longitudinal axis of one roller of each of the at least one forming and discharge rollers.

46. The apparatus of claim 37 further comprising a fill tube positioned upstream of the at least one forming roller.

47. A method for forming a sheet of material from a substantially liquid starting material comprising the steps of:

providing at least two sets of opposed rollers and first and second endless belts, at least one of a first set of opposed rollers having a contoured surface, each of the first and second endless belts being positioned about at least one roller of each set of opposed rollers such that a pocket is formed between the first and second endless belts;

emitting material in substantially liquid form upon the endless belts upstream of the first set of opposed rollers; and causing the rollers to spin and the first and second endless belts to revolve about the rollers such that a sheet of material is produced upon drawing the material between the two sets of opposed rollers.

48. An apparatus for forming a sheet of material from a substantially liquid starting material comprising:

at least one forming roller having a contoured surface;

a member which opposes the forming roller;

at least one discharge roller positioned downstream from the at least one forming roller;

a member which opposes the discharge roller;

a first endless belt that revolves about the at least one forming roller and the at least one discharge roller;

a second endless belt that advances in the same direction as the first endless belt advances, the first and second endless belts cooperating with each other and with the rollers when the belts are between the at least one forming roller and the at least one discharge roller and the opposing members to form a pocket; and a drive mechanism that causes the forming and discharge rollers to spin about their longitudinal axis and the first and second endless belts to revolve about the rollers.

49. A method for forming a sheet of material from a substantially liquid starting material comprising the steps of:

providing first and second endless belts and arranging the first and second belts such that they have a section here they are arranged opposed to each other;

forming a pocket between the first and second endless belts at a first end of the section;

emitting material in substantially liquid form upon the endless belts upstream of the pocket; and causing the first and second endless belts to revolve such that a sheet of material is produced upon drawing the material between the two endless belts.

50. An apparatus for forming a sheet of material from a substantially liquid starting material comprising:

a first endless belt that is revolvingly driven;

a second endless belt that advances in the same direction as the first endless belt advances;

a concave surface engaging at least one of the endless belts, the first and second endless belts cooperating with each other and with the concave surface to form a pocket; and a drive mechanism that causes the first and second endless belts to revolve.

* * * * *

UNITED STATES PATENT AND TRADEMARK OFFICE
CERTIFICATE OF CORRECTION

PATENT NO. :  5,527,551
DATED      :  June 18, 1996
INVENTOR(S):  Orville C. Fager et al.

It is certified that error appears in the above-indentified patent and that said Letters Patent is hereby corrected as shown below:

On the Title Page

In column 1, line 4 under "References Cited U.S. PATENT DOCUMENTS", delete "Pontegorvo et al." and substitute --Pontecorvo et al.--.

In claim 49, line 4, delete "here" and substitute --where--.

Signed and Sealed this

Twenty-ninth Day of July, 1997

Attest:

BRUCE LEHMAN

Attesting Officer

Commissioner of Patents and Trademarks